Patented Feb. 13, 1923.

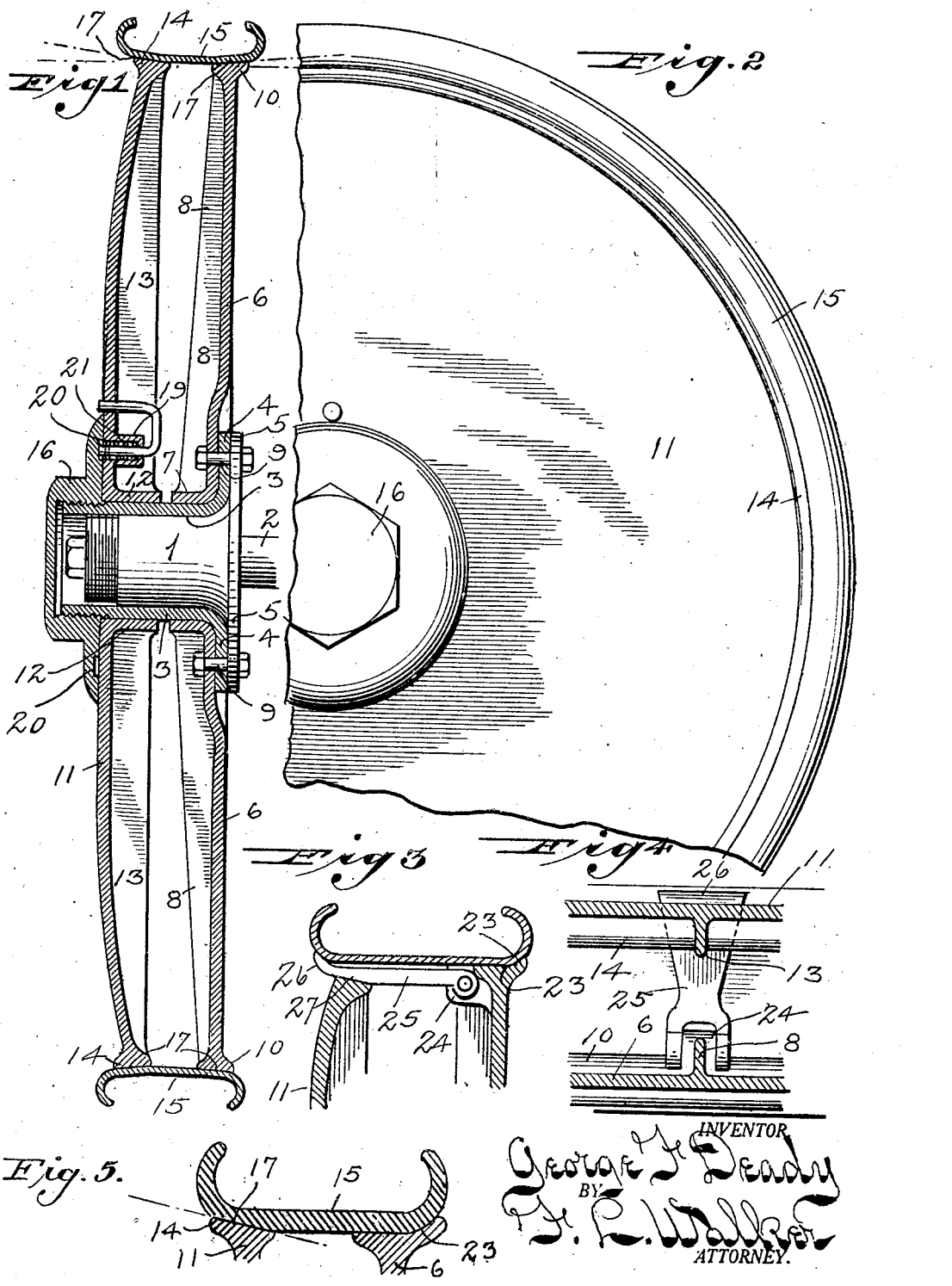

1,445,492

UNITED STATES PATENT OFFICE.

GEORGE F. DEADY, OF DAYTON, OHIO, ASSIGNOR, BY DIRECT AND MESNE ASSIGNMENTS, TO THE DAYTON DISC WHEEL COMPANY, OF DAYTON, OHIO, A CORPORATION OF OHIO.

VEHICLE WHEEL.

Application filed February 7, 1921. Serial No. 443,261.

*To all whom it may concern:*

Be it known that I, GEORGE F. DEADY, a citizen of the United States, residing at Dayton, in the county of Montgomery and State of Ohio, have invented certain new and useful Improvements in Vehicle Wheels, of which the following is a specification.

My invention relates to vehicle wheels and more particularly to wheels of the disc or continuous web type particularly adapted for motor vehicles.

The object of the invention is to simplify the structure as well as the means and mode of applying such wheels and mounting the tire rims thereon, whereby they will not only be cheapened in construction, but will be more efficient in use, positive in operation, easily and quickly mounted and demounted, and unlikely to get out of repair.

A further object of the invention is to provide a disc or web wheel of light but strong construction, which may be readily produced either by casting from molten metal or by stamping the parts from sheet metal.

A further object of the invention is to provide such a disc or web wheel, which will be readily applicable to existing vehicles, employing the original wheel hub designed for wooden spokes as a support and attachment for the disc or web of the present construction.

A further object of the invention is to afford improved means for securing the demountable rim upon such wheel, whereby it will not only be securely held while in use, but will be drawn into uniform bearing engagement with the periphery of the disc wheel, and will be readily demountable from the wheel, without the necessity of attachment bolts, keys or other such means.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a sectional view of the assembled wheel forming the subject matter hereof. Fig. 2 is a side elevation of a portion of the wheel. Figs. 3 and 4 are detail sectional views of a modification of the rim engaging means. Fig. 5 is an enlarged detail sectional view of the rim and engaging portions of the disc.

Like parts are indicated by similar characters of reference thruout the several views.

Referring to the accompanying drawings, wherein is illustrated the preferred, but not necessarily the only embodiment of the invention, 1 is a standard motor vehicle hub and 2 the axle, as at present employed in motor vehicles. In the original construction for which the hub 1 was designed, a series of radially disposed wood spokes were bolted to the hub flange in the position occupied by the disc or web hereafter described. Mounted upon the standard wheel hub 1 is a flanged sleeve or auxiliary hub 3, the interior bore of which conforms quite closely to the peripheral surface of the hub 1, and the flange 4 of which abuts upon the hub flange 5. Slidingly mounted upon this auxiliary hub or sleeve 3 and abutting upon the outer face of the sleeve flange 4, is a circular supporting disc or web 6, having at its center an opening surrounded by a flange 7 which conforms to the exterior of the auxiliary hub or sleeve 3. This web or disc 6 is preferably though not necessarily strengthened by radially disposed ribs 8. The hub 1, auxiliary hub 3 and the disc 6 which comprises the inner face of the wheel, are fixedly yet detachably interconnected by bolts or studs 9 thru the flanges 4 and 5 of the auxiliary hub or sleeve and the standard wheel hub and also thru the web 6. By this means, the web 6 is connected for rotation in unison with the hub. The outer periphery of the disc or web 6 is enlarged to afford marginal flanges or beads 10, the peripheral face of which is beveled outwardly and rearwardly in relation with the plane of the wheel. Slidingly adjusted upon the auxiliary hub or sleeve 3 in a plane parallel with that of the disc or web 6 is a second disc or web 11, likewise having a central opening surrounded by a flange 12, conforming to the exterior diameter of the sleeve or auxiliary hub 3, the face of this disc or web 11 may be given any desired ornamental configuration for ornamental purposes. That is to say, it may be provided with a series of concentric grooves or beads or radially disposed ribs or depressions or ornamental figures may be traced in any manner thereupon. In the drawing no attempt has been made at ornamentation, and the disc or web 11 has been shown as of a simple, plain convex form. This web 11 like the innermost web 6 may if desired be reinforced by radially disposed ribs 13, or by suitable corrugations therein, the outer periphery of this disc or web 11 is likewise formed with a marginal flange or bead, 14 the outer face of which is beveled inwardly and rearwardly or in a direction opposite to the peripheral bevel of the web 6. The angularity of the beveled peripheries of the discs or webs is comparatively slight and agrees substantially with the beveled or inclined surfaces, ordinarily found upon the inner periphery of the tire rim 15. The web or disc 11 is slidingly adjustable upon the sleeve or auxiliary hub 3 to and from the inner disc or web 6. It is forcibly drawn inward by means of a flanged hub cap 16, screw threaded upon the extremity of the auxiliary hub or sleeve 3.

The tire rim 16 is of standard construction, and is a rim such as is now commonly employed upon motor vehicles. The standard rim at the present time does not have an exactly flat or cylindrical inner surface, but the inner face of the channelled rim is slightly inclined or tapered as at 17, with which taper the inclined or beveled peripheries of the webs 6 and 11 agree. The rim 15 is positioned about tapered peripheries of the webs 6 and 11 with the webs in a distended or separated relation. By the adjustment of the hub cap 16, the outermost web or disc 11 is pressed inwardly toward the inner disc or web 6, thereby exerting a camming or wedging action upon the inner beveled faces of the surrounding tire rim 15, causing the disc and rim to firmly seat one upon the other. The tapered or slightly divergent shape of the inner face of the rim and corresponding shape of the peripheries of the disc prevents the rim from being laterally displaced while in use, yet it is readily removable by releasing the pressure upon the movable disc or web 11, thereby permitting its tapered periphery to be withdrawn from engagement with the internal taper of the rim.

Any suitable form of nut lock may be employed for retaining the hub cap in its adjusted position. There has been shown in Fig. 1 a form of detent pawl comprising a substantially U-shaped spring actuated plunger one arm of which has a reciprocating bearing in a lug or boss 19, on the inner face of the web or disc 11, thru which it extends into engagement with a series of ratchet teeth 20 in the inner face of the hub cap 16. This U-shaped plunger is actuated by a spring 21 into engagement with such ratchet teeth, while the opposite arm of the U-shape plunger extends thru a suitable opening in the web 11 beyond the periphery of the flange of the hub cap. By depressing the protruding end of the latter arm the plunger is disengaged from the hub cap, permitting the latter to be removed. However, upon the adjustment of the hub cap the inclined ratchet teeth will ride freely over the spring actuated plunger, which will automatically engage each succeeding ratchet tooth.

In Figs. 3 and 4 there has been shown a modification of the rim engaging means particularly applicable to those rims which do not have the desired internal bevel or inclined surfaces, and for conditions of use, wherein the use of the beveled pressure disc as heretofore described may for any reason be undesirable. In the construction shown in Fig. 3, the innermost disc or web 6 is provided with a peripheral seat 23, upon which one side of the tire rim bears. Hinged to the inner face of the disc 6 by means of suitable spaced lugs 24, are a plurality of transversely arranged fingers or rim engaging arms 25, the ends of which are out-turned as at 26 to afford a seat for the opposite marginal edge of the tire rim. The inner faces of these rim engaging fingers or arms 24 are beveled at 27, to agree with the peripheral bevel of the adjustable web or disc 11. Thus instead of directly engaging the tire rim as in the construction shown in Fig. 1, the adjustable disc or web 11 engages the beveled surface of the arm 24, tending by its cam like action outwardly, thereby increasing the pressure of the rim seat 26 upon the engaged rim.

The rim engaging arms or fingers 24 may be provided in any desired number or spaced relation.

The modified construction shown in Fig. 4 possesses the same wedging or cam-like action to tighten the rim upon the wheel disc or web, and afford the same advantages as the primary construction, the principal difference being the interposing of an intermediate bearing member between the adjustable disc and the rim.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a vehicle wheel, an annular rim, a pair of relatively movable discs surrounded by said rim, means for adjusting said discs in relation one with the other, a peripheral seat upon one of said discs for the rim, a peripheral cam face upon the other disc bearing against the inner circumferential face of said annular rim adapted upon relative adjustment of the discs to exert an outward expanding pressure upon said rim.

2. In a vehicle wheel, an annular rim, two relatively movable discs enclosed in said rim having oppositely tapered peripheral surfaces, engaging with said rim in planes offset inwardly or each toward the other, in relation with the marginal plane of the rim, when operatively engaged therewith and means for relatively adjusting the discs in relation one with the other whereby the camming action of the oppositely tapered peripheries of the discs will subject the rim to internal expanding pressure.

3. In a vehicle wheel, an annular rim, two relatively movable discs enclosed within the rim and engaging the rim intermediate the lateral margins thereof, means for laterally adjusting the discs in relation one with the other, and means whereby the relative lateral adjustment of the discs exerts an expanding pressure by which the rim is securely held upon the discs.

4. In a vehicle wheel, the combination with a standard vehicle wheel hub, of a flanged sleeve to enclose the hub, a pair of discs laterally adjustable in relation one with the other, a rim surrounding said discs, said flanged sleeve extending axially thru said discs with its flange engaging the outer face of one disc, and a clamp nut screw threaded upon the extended end of said sleeve, an operative driving connection between the said sleeve and said hub and engaging the outer face of the other disc by which the discs are laterally adjusted to effect an operative engagement of the rim and discs whereby said parts are held in unitary assembled relation, independent of the hub.

5. The combination of a sleeve to inclose the hub of a vehicle wheel, interconnecting means affording a driving engagement therewith, a pair of discs mounted upon the sleeve and laterally adjustable in relation one with the other, a rim enclosing said discs and a clamp nut screw threaded upon said sleeve and by its adjustment holding the discs in operative engagement with the rim, said parts being held in unitary assembled relation independent of the enclosed hub.

6. In a vehicle wheel, the combination of a separable rim, a pair of independent discs engaging the rim adjacent to the opposite edges thereof, the marginal surface of one of the discs being cylindrical thruout a portion of its width and conical thruout the remainder of its width, the conical and cylindrical portions intersecting each other with the conical portion extending divergently outward from the line of intersection, and means to adjust said disc in relation with the other disc.

7. In a vehicle wheel, the combination of a pair of independent discs, and an independent rim engaged adjacent to its opposite edges by the respective discs one of said discs having an outwardly inclined marginal surface affording wedging engagement with the rim and an inwardly extending guide portion substantially parallel with the axis of the disc intersecting such outwardly inclined surface, and means for adjusting such disc in relation with the other.

8. In a vehicle wheel, an annular rim having arcuate side flanges merging into the inner circumferential face of the rim, a pair of independent spaced discs having oppositely tapered peripheral seats engaging with the rim substantially at the point of mergence of the arcuate side flanges into the inner circumferential surface, and means to relatively move the discs one toward the other to exert an outward camming action upon the rim subjecting the rim to radial expanding pressure.

9. In a vehicle wheel, the combination with a standard annular tire rim having arcuate side faces merging into the inner circumferential face of the rim, of two relatively adjustable wheel discs, the marginal edges of one of which is acutely inclined in relation with the axis of the wheel and engages the rim at substantially the merging point of the arcute lateral and circumferential inner faces of the tire rim, and means for relatively adjusting the discs, whereby said inclined edge will exert a camming action upon the rim to afford a radially expanding pressure.

10. In a vehicle wheel, the combination with a standard annular tire rim having arcuate side faces merging into the inner circumferential face of the rim, of two relatively adjustable wheel discs forming seats for the annular rim, the margins of one of the discs being inclined at an angle less than thirty degrees in relation with the wheel axis and means for relatively adjusting the discs whereby said inclined disc margin will exert radial camming pressure within the rim.

In testimony whereof, I have hereunto set my hand this 11th day of January A. D. 1921.

GEORGE F. DEADY.

Witnesses:
JOHN DINEEN,
GEORGE C. HELMIG.